US010877656B1

(12) United States Patent
Ryan

(10) Patent No.: US 10,877,656 B1
(45) Date of Patent: Dec. 29, 2020

(54) ACCESSIBILITY-COMPATIBLE CONTROL ELEMENTS FOR MEDIA PLAYERS

(71) Applicant: BUILDSCALE, INC., Kitchener (CA)

(72) Inventor: Brandon Alexander Ryan, Kitchener (CA)

(73) Assignee: BUILDSCALE, INC., Kitchener (CA)

( * ) Notice: Subject to any disclaimer, the term of this patent is extended or adjusted under 35 U.S.C. 154(b) by 0 days.

(21) Appl. No.: 16/776,801

(22) Filed: Jan. 30, 2020

(51) Int. Cl.
*G06F 3/0484* (2013.01)
*G11B 27/00* (2006.01)

(52) U.S. Cl.
CPC ........ *G06F 3/04847* (2013.01); *G11B 27/005* (2013.01)

(58) Field of Classification Search
None
See application file for complete search history.

(56) References Cited

U.S. PATENT DOCUMENTS

| 10,530,872 B1* | 1/2020 | Beach | H04L 67/16 |
| 2009/0158326 A1* | 6/2009 | Hunt | G06F 3/04817 |
| | | | 725/38 |
| 2012/0311508 A1* | 12/2012 | Fleizach | G06F 3/0488 |
| | | | 715/863 |
| 2013/0166587 A1* | 6/2013 | Berry | G06F 16/48 |
| | | | 707/769 |
| 2014/0164178 A1* | 6/2014 | Adjaoute | G06Q 30/0609 |
| | | | 705/26.35 |
| 2015/0106719 A1* | 4/2015 | Petro | H04N 21/4884 |
| | | | 715/719 |

OTHER PUBLICATIONS

Piejko, List of User Agent Strings. Posted on Oct. 23, 2018 and retrieved from [https://deviceatlas.com/blog/list-of-user-agent-strings] on [Apr. 9, 2020] (Year: 2018).*
Casario et al. HTML5 Solutions. Essential Techniques for HTML5 Developers, Chapters 5 and 12. (c) 2011. 75 pages. (Year: 2011).*
Diggs et al. Accessible Rich Internet Applications (WAI-ARIA) 1.1. Dec. 14, 2017. Retrieved from [http://www.w3.org/TR/wai-aria/] on [Apr. 3, 2020]. 179 pages. (Year: 2017).*

(Continued)

*Primary Examiner* — Amy M Levy
(74) *Attorney, Agent, or Firm* — Perry + Currier, Inc.

(57) ABSTRACT

A computing device includes: an input assembly; a display; and a controller configured to: execute a browser application to control the display to render a page containing a media presentation element to present multimedia content received at the computing device, a primary seek element selectable to control a playback position in the media presentation element, wherein the primary seek element includes an attribute hiding the primary seek element from a screen reader process of the computing device, and an auxiliary seek element selectable to control the playback position in the media presentation element; receive input data indicating a selection of the auxiliary seek element generated via execution of the screen reader process; and in response, control the display to adjust the playback position in the media presentation element according to the input data.

18 Claims, 6 Drawing Sheets

(56) References Cited

OTHER PUBLICATIONS

Orange web accessibility guidelines. Accessible hiding and aria-hidden example. Available Mar. 30, 2018. Retrieved via Internet Archive from [https://a11y-guidelines.orange.com/web_En/exemples/masquage/index.html] on [Apr. 3, 2020]. 2 pages. (Year: 2018).*
Moreno et al. HTML 5 Support for an Accessible User-Video-Interaction on the Web. Interact 2011, Part IV, LNCS 6949, pp. 535-539, 2011. © IFIP International Federation for Information Processing 2011. (Year: 2011).*
Earl et al. HTML5 Accessible Video Player-How and Why. W4A'16, Apr. 11-13, 2016, Montreal, Canada. 4 pages. (Year: 2016).*
Thompson, Terril. Media Player Accessibility: Summary of Insights from Interviews & Focus Groups. Journal on Technology and Persons with Disabilities Santiago, J. (Eds): CSUN Assistive Technology Conference © 2018 California State University, Northridge. pages 325-335. (Year: 2018).*
Apple. About HTML5 Audio and Video © 2012. Retrieved from [https://developer.apple.com/library/archive/documentation/AudioVideo/Conceptual/Using_HTML5_Audio_Video/Introduction/Introduction.html] on [Apr. 10, 2020]. 5 pages. (Year: 2012).*

* cited by examiner

ACCESSIBILITY-COMPATIBLE CONTROL ELEMENTS FOR MEDIA PLAYERS

FIELD

The specification relates generally to multimedia playback, and specifically to a method and system for accessibility-compatible control elements for media players.

BACKGROUND

Various computing devices can be controlled to present multimedia data (e.g. video) to operators of computing devices. Presentation of multimedia data on a given computing device may be enabled within a browser application that provides input elements selectable by the operator to control playback. An example of such an input element is a seek bar to control playback progress of a video.

Some computing devices also implement accessibility functions, such as a screen reader process configured to process inputs received from the operator before passing the inputs (or other inputs derived therefrom) to the browser application to control multimedia playback. In some cases, however, the screen reader process may fail to correctly pass inputs to the browser application, resulting in difficulties in controlling multimedia playback while the screen reader process is active.

SUMMARY

An aspect of the specification provides a computing device, comprising: an input assembly; a display; and a controller connected with the input assembly and the display, the controller configured to: via execution of a browser application, control the display to render a page containing (i) a media presentation element to present multimedia content received at the computing device; (ii) a primary seek element selectable to control a playback position in the media presentation element, wherein the primary seek element includes an attribute hiding the primary seek element from a screen reader process of the computing device; and (iii) an auxiliary seek element selectable to control the playback position in the media presentation element; receive input data indicating a selection of the auxiliary seek element generated via execution of the screen reader process; and in response to receiving the input data, control the display to adjust the playback position in the media presentation element according to the input data.

Another aspect of the specification provides a method, comprising: at a processor of a computing device having a display and an input assembly, executing a browser application to control the display to render a page containing (i) a media presentation element to present multimedia content received at the computing device; (ii) a primary seek element selectable to control a playback position in the media presentation element, wherein the primary seek element includes an attribute hiding the primary seek element from a screen reader process of the computing device; and (iii) an auxiliary seek element selectable to control the playback position in the media presentation element; receiving input data at the processor from the input assembly indicating a selection of the auxiliary seek element generated via execution of the screen reader process; and in response to receiving the input data, controlling the display to adjust the playback position in the media presentation element according to the input data.

A further aspect of the specification provides a server, comprising: a communications interface; a memory storing: a first web page having an identifier and containing (i) a media presentation element to present multimedia content received at the computing device; (ii) a primary seek element selectable to control a playback position in the media presentation element, wherein the primary seek element includes an attribute hiding the primary seek element from a screen reader process of the computing device; and (iii) an auxiliary seek element selectable to control the playback position in the media presentation element; and a second web page having the identifier and containing (i) the media presentation element to present multimedia content received at the computing device; (ii) the primary seek element selectable to control a playback position in the media presentation element, wherein the primary seek element includes an attribute hiding the primary seek element from a screen reader process of the computing device; and a processor configured to receive a request including the identifier, retrieve one of the first and second web pages, and return the retrieved one of the web pages in response to the request.

BRIEF DESCRIPTIONS OF THE DRAWINGS

Embodiments are described with reference to the following figures, in which.

DETAILED DESCRIPTION

Figure 1:
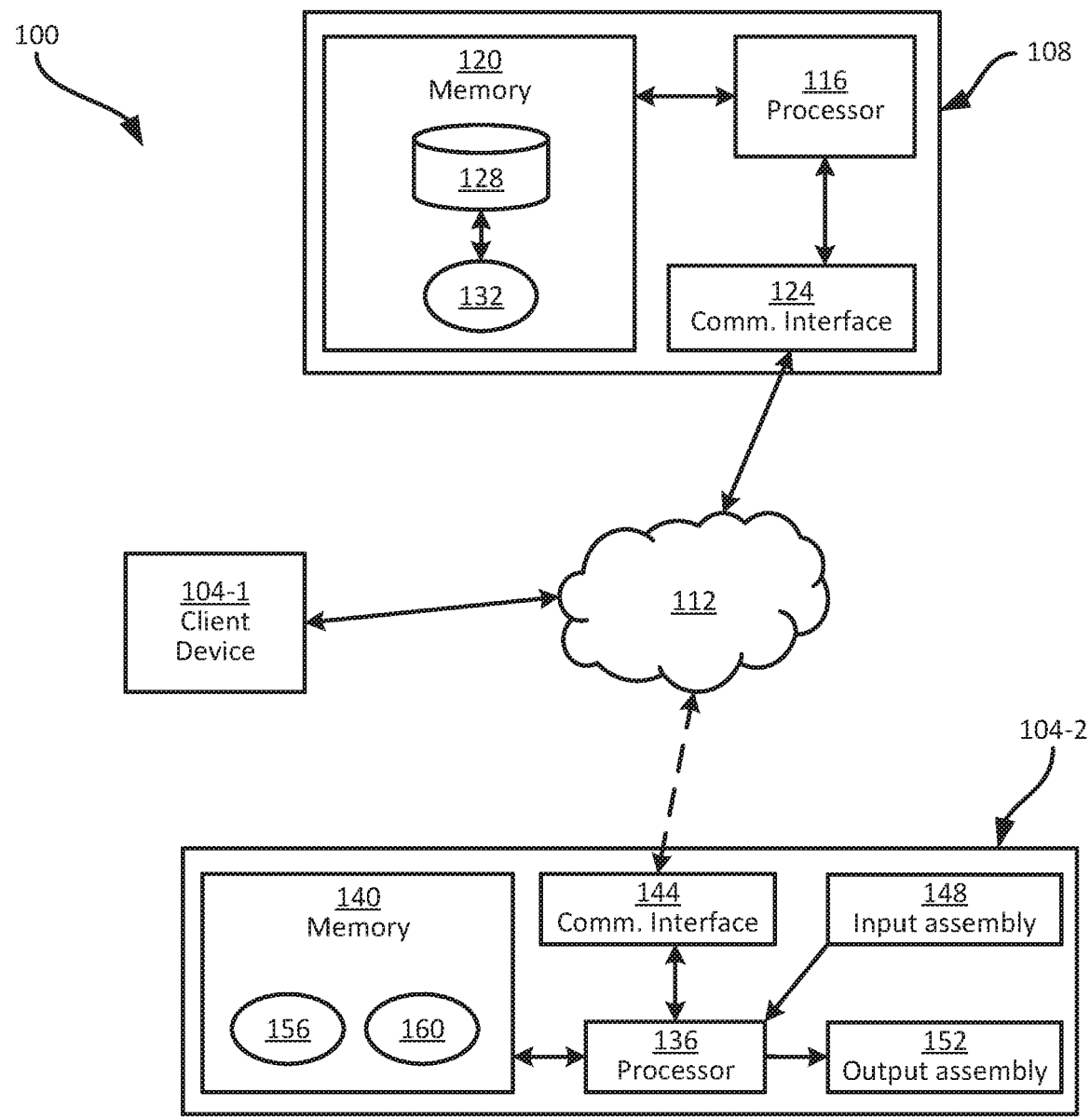
FIG. 1 is a diagram of a system for accessibility-compatible multimedia playback.

FIG. 1 depicts a system 100 for accessibility-compatible multimedia playback. In particular, the system 100 enables playback of multimedia content by at least one client device; of which two examples 104-1 and 104-2 are shown in FIG. 1. The client device 104-1 is a desktop computer or the like, while the client device 104-2 is a mobile computing device, such as a smartphone, a tablet computer or the like.

The above-mentioned multimedia content may be hosted at a server 108, such as a web server, in communication with the client devices 104 via a network 112. The network 112 can include any suitable combination of local and wide-area networks, including the Internet. The multimedia content, such as a video file, can be provided to a client device 104 upon transmission of a request from that client device 104 to the server 108 via the network 112.

The server 108 includes at least one processor 116, such as a central processing unit (CPU) or the like. The processor 116 is interconnected with a memory 120, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 116 and the memory 120 are generally comprised of one or more integrated circuits (ICs).

The processor 116 is also interconnected with a communication interface 124, which enables the server 108 to communicate with other computing devices of the system 100 (e.g. the client devices 104) via the network 112. The communication interface 124 therefore includes any necessary components (e.g. network interface controllers (NICs) and the like) to communicate via the network 112. The specific components of the communication interface 124 are selected based on the nature of the network 112. The server 108 can also include input and output assemblies connected to the processor 116, such as keyboards, mice, displays, and the like (not shown).

The above components of the server 108 can be deployed in a single enclosure, or in a distributed format. In some examples, therefore, the server 108 includes a plurality of processors, either sharing the memory 120 and communication interface 124, or each having distinct associated memories and communication interfaces.

The memory 120 stores a repository 128 containing the multimedia content. In the present example, the repository 128 contains at least one web page that includes the multimedia content in the form of a video file. The memory 120 also stores computer-readable instructions executable by the processor 116 to implement various functionality. The computer-readable instructions may also be referred to as applications, and in the illustrated example the memory 120 stores a web server application 132, the execution of which by the processor 116 configures the server 108 to respond to requests for the web page from the client devices 104 by transmitting the web page to the requesting client device 104.

The client devices 104, in turn, include components enabling the presentation (i.e. playback) of the multimedia content and control of such presentation. Certain components of the client device 104-2 are shown in FIG. 1 for illustrative purposes. The client device 104-2 includes a processor 136 interconnected with a memory 140 and a communications interface 144. The client device 104-2 also includes an input assembly 148, including any suitable combination of keys, buttons, touch screens, microphones and the like to accept input from an operator of the client device 104-2 and provide data representative of such input to the processor 136. In addition, the client device 104-2 includes an output assembly 152, including any suitable combination of displays, speakers and the like, controllable by the processor 136 to present various outputs to the operator of the client device 104-2.

As will now be apparent, the output assembly 152 can be controlled by the processor 136 to present multimedia content such as the above-mentioned video file received from the server 108. Presentation of multimedia content can be performed via the execution of computer-readable instructions stored in the memory 140 (e.g. one or more applications, as mentioned above in connection with the server 108). In the present example, the memory 140 stores a web browser application 156 (also referred to simply as the browser 156), execution of which by the processor 136 configures the client device 104-2 to request a web page containing multimedia content from the server 108. Execution of the browser 156 also enables the presentation of multimedia content via the control of the output assembly 152.

Presentation of multimedia content at the client device 104-2 may also be manipulated by the operator of the client device 104-2. For example, the browser 156 can configure the client device 104-1 to generate, along with the multimedia content itself, any of a variety of control elements that are selectable or otherwise activatable (e.g. by the operator of the client device 104-2) to play, pause, stop, or fast-forward the multimedia content. Such control elements can also include seek elements that can be selected or otherwise activated to change a playback position of the multimedia content. The web page containing the multimedia content can include indications of which control element(s) are to be generated, as well as attributes of such control elements.

Presentation of multimedia content may involve rendering a graphical portion of the multimedia content, as well as the above-mentioned control elements, on a display, and playback of an audio portion of the multimedia content via a speaker. Playback control, including control of playback position via the above-mentioned seek elements, may therefore be achieved by selection, e.g. via a touch screen, of a rendered control element.

The client device 104-2 may also enable auxiliary playback control mechanisms, e.g. for use by operators with visual impairments that render the use of displayed control elements difficult or impossible. To that end, the memory 140 stores an accessibility application 160, which may also be referred to as a screen reader 160. The screen reader 160, when executed by the processor 136, acts as an intermediary between the input assembly 148 and the browser 156. When the screen reader 160 is active (i.e. currently being executed by the processor 136), the screen reader 160 detects the above-mentioned playback control elements implemented by the browser 156 as a result of the indications in the web page. The screen reader 160 also processes any inputs received via the input assembly 148, for example to generate audible instructions (e.g. via text-to-speech), and passes the inputs (or other inputs derived therefrom) to one of the detected playback control elements of the browser 156.

For example, the browser 156 can generate, according to indications contained in the web page, a slider element that is selectable via a touch screen to adjust a playback position of the multimedia content. When the screen reader 160 is active, activation of a volume button of the input assembly 148 can be processed by the screen reader 160 to generate an audible indication of a current playback position, and to pass an activation of the slider element to the browser 156 for updating the playback position. Various other interactions with the input assembly 148 can also be processed by the screen reader 160 to generate the audible indication of current playback position and activate the slider element. Examples of such interactions include swipe gestures, activation of other buttons, and the like.

Under some conditions, however, the intermediation activity of the screen reader 160 as described above fails. For example, some web pages may include custom seek elements (e.g. defined by JavaScript code or any other suitable computer-readable instructions) rather than indications to generate a native seek element such as the above-mentioned slider. The screen reader 160 may not correctly pass inputs to such custom seek elements, and accessible playback position adjustment may therefore be prevented when the screen reader 160 is active. Custom seek elements may be employed within web pages to provide additional functionality (e.g. usage data collection and reporting), additional graphical content (e.g. branding or other content), or a combination thereof. Such additional functionality and/or content is no longer available if the web pages are reconfigured to make use of native seek elements to restore accessibility function.

The system 100 therefore implements functionality to enable the continued use of custom seek elements in web pages, referred to below as primary seek elements, while also enabling accessible playback control via execution of the screen reader 160. To that end, the web page stored in the repository 128 also includes at least one auxiliary seek element. The client device 104-2 enables control of playback position in the multimedia content via the primary seek element when the screen reader 160 is not active, and via the auxiliary seek element(s) when the screen reader 160 is active.

Figure 2:
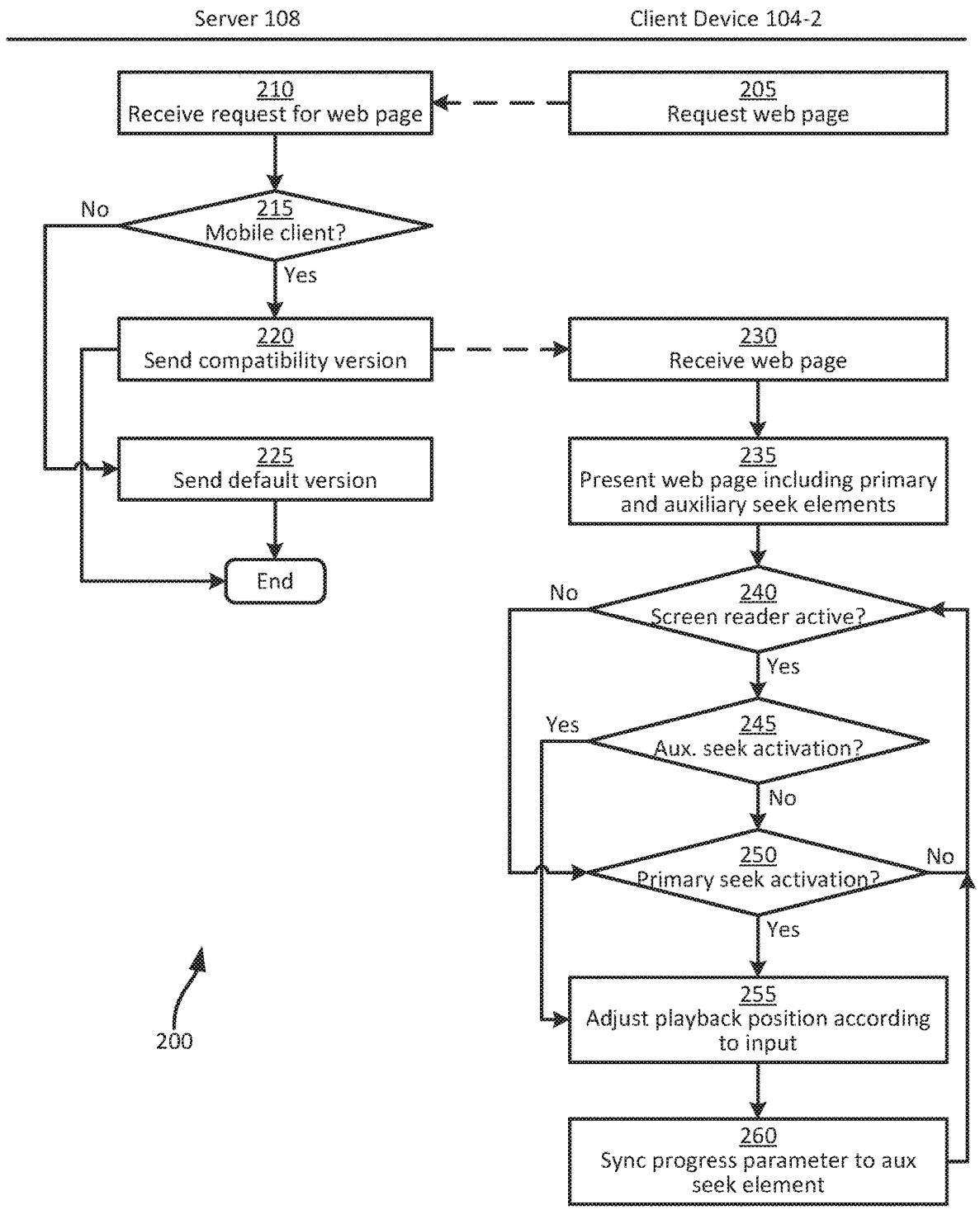
FIG. 2 is a flowchart of a method for accessibility-compatible multimedia playback.

Turning to FIG. 2, a method 200 of enabling accessibility-compatible multimedia control is shown. The method 200 will be described below in conjunction with its performance within the system 100. In particular, as indicated in FIG. 2, certain blocks of the method 200 are performed by the server 108, while other blocks of the method 200 are performed by the client device 104-2.

At block 205, the client device 104-2 requests the web page stored in the repository 128, via execution of the browser 156. The request sent at block 205 can take a wide variety of forms, including for example a HyperText Transfer Protocol (HTTP) request including an identifier of the server 108 and/or the web page itself. At block 210, the server 108 receives the request for the web page, and at block 215 the server 108 can determine whether the requester (i.e. the client device 104-2 in the present example) is a mobile device. The determination at block 215 can be based on the content of the request itself, which may indicate explicitly that the client device 104-2 is a mobile device, or which may contain implicit indicators that the client device 104-2 is a mobile device.

When the determination at block 215 is affirmative, the server 108 proceeds to block 220 to retrieve and send to the requesting device a compatibility version of the web page. The compatibility version of the web page includes the above-mentioned auxiliary seek element(s) as well as the primary seek element. When the determination at block 215 is negative, the server 108 proceeds to block 225 to retrieve and send to the requesting device a default version of the web page, which does not include the auxiliary seek element(s).

The determination at block 215, and the use of distinct versions of the web page, reflects the fact that non-mobile client devices, such as the client device 104-1 shown in FIG. 1, may not be vulnerable to the screen reader failure mentioned above. For such client devices 104, an equivalent application to the screen reader 160 may interact correctly with the primary seek element, such that playback control can be effected with or without a screen reader, using the primary seek element. In other examples, blocks 215 and 225 can be omitted and the compatibility version of the web page can always be served at block 220. When the compatibility version of the web page is served to both mobile and non-mobile client devices 104, non-mobile client devices can omit generation of auxiliary seek element(s).

At block 230, the requesting device, which in the present example is assumed to be the client device 104-2, receives the web page from the server 108. In the present example, the client device 104-2 therefore receives the compatibility version of the web page, containing both the primary seek element and the auxiliary seek element(s).

At block 235, the client device 104-2 presents the web page via the output assembly 152 by executing the browser 156, for example by rendering graphical elements on a display and, if applicable, playing audio via a speaker. Presenting the web page can also include generating seek elements that are not rendered visually on the display, and therefore are not directly accessible by the operator of the client device 104-2, as will be discussed below.

Figure 3:
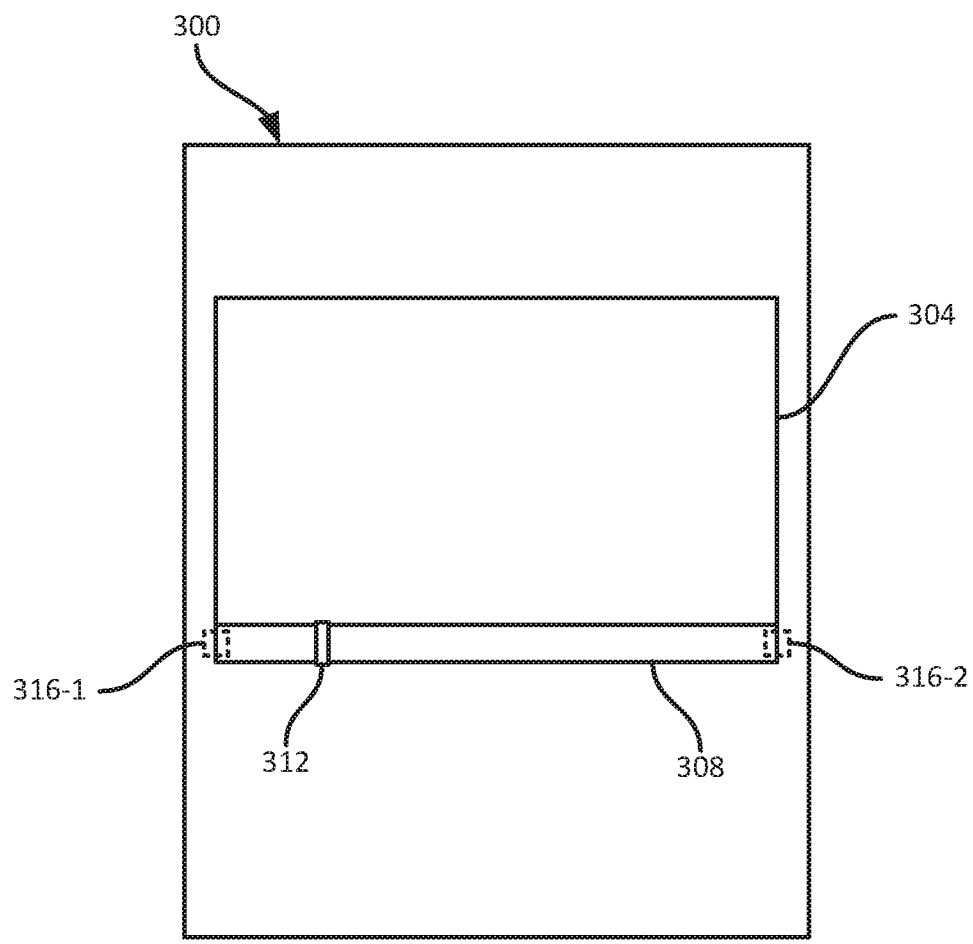
FIG. 3 is a diagram illustrating the generation of a web page during the performance of the method of FIG. 2.

As noted earlier, the web page includes both primary and auxiliary seek elements, and both such elements are generated at block 235. Turning briefly to FIG. 3, a display 300 of the output assembly 152 is shown following an example performance of block 235. The web page as rendered on the display 300 includes a multimedia presentation element (e.g. a video player) 304. The multimedia presentation element 304, as will be apparent to those skilled in the art, serves to display a graphical portion of the multimedia content in the web page. The multimedia presentation element 304 maintains various attributes, including a playback position, such as a time indicating the currently displayed portion of the content, between a time of zero and a time equal to the total length of the content.

The page as rendered also includes a primary seek element 308, in the form of a slider with a selectable handle 312. The position of the handle 312 along the slider 308 indicates the above-mentioned playback position. The position of the handle 312 is updated during playback of the multimedia content, as the playback position itself changes. The handle 312 may also be selected, e.g. via a touch screen integrated with the display 300, to adjust the playback position. In other words, input selecting and moving the handle 312 updates both the position of the handle 312 and the playback position of the multimedia presentation element 304.

As noted earlier, the screen reader 160 may not correctly pass inputs to the primary seek element 308. The primary seek element 308 therefore includes an attribute that hides the primary seek element 308 from the screen reader 160. An example of such an attribute is the "aria-hidden" HTML5 attribute, which results in the primary seek element 308 remaining undiscoverable by the screen reader 160.

To enable manipulation of the playback position by an operator with a visual impairment when the screen reader 160 is active, the page also includes first and second auxiliary seek elements 316-1 and 316-2. The auxiliary seek elements 316, in the present example, are buttons whose activation generates decrement and increment instructions, respectively, for application to the playback position. The increment and decrement applied by the elements 316 can be specified as attributes within the web page (e.g. 5 seconds, although smaller and larger values may also be employed). In some examples, the amount of the increment or decrement can be determined dynamically at block 235, for example as a percentage of the total length of the multimedia content. The auxiliary seek elements 316 are exposed to the screen reader 160, unlike the primary seek element 308.

The auxiliary seek elements 316, in the illustrated example, are rendered as transparent elements and are therefore not visible to an operator of the client device 104-2. In addition, the auxiliary seek elements 316 may be located outside the perimeter of the primary seek element 308 to reduce the likelihood of accidental activation of the auxiliary seek elements 316 by the operator. The auxiliary seek elements 316 may also be sized to further reduce such likelihood (e.g. having a size of a single pixel). In other examples, the auxiliary seek elements 316 may include an attribute that hides the auxiliary seek elements 316 entirely from visually rendering, while leaving the auxiliary seek elements 316 exposed to the screen reader 160.

Returning to FIG. 2, handling of input received during presentation of the web page varies based on whether the screen reader 160 is active. When the screen reader 160 is active, the client device 104-2 proceeds from block 240 to block 245. At block 245, via execution of the screen reader 160, the client device 104-2 monitors input data received from the input assembly 148 and determines whether the input data represents an activation of one of the auxiliary seek elements 316. For example, the screen reader 160 can detect a touch-based swipe gesture across the display 300 as an input to switch focus between detected inputs, and to detect a double-tap input received at the display 300 as an input to activate the currently focused input element. When focus is switched between screen reader-detectable elements, the screen reader 160 can generate audio output informing the operator of the nature of the currently focused input. For example, the auxiliary seek elements can include attributes containing descriptions for use in generating such audio output (e.g. via text-to-speech).

When the determination at block 245 is negative, indicating that no activation of the auxiliary seek elements 316 has been detected (regardless of whether the auxiliary seek elements 316 have been focused), the client device 104-2 proceeds to block 250. At block 250, via execution of the browser 156, the client device 104-2 determines whether an activation of the primary seek element 308 has been received. The determination at block 250 is not performed by the screen reader 160 because the screen reader 160 is unaware of the existence of the primary seek element 308 as a result of the above-mentioned "aria-hidden" attribute.

If the determination at block 250 is also negative, no inputs have been detected by either the screen reader 160, monitoring for activation of the auxiliary seek input elements 316, or by the browser 156, monitoring for activation of the primary seek input 308. Performance of the method 200 therefore returns to block 240 and playback continues. When the determination at block 245 is affirmative, however, the screen reader 160 passes an instruction to the browser 156 indicating activation of the relevant one of the auxiliary seek elements 316, and the client device 104-2 proceeds to block 255.

When the determination at block 250 is affirmative, the client device 104-2 also proceeds to block 255. At block 255, the browser 156, based on input received from the screen reader 160 (via block 245) or received at the browser 156 itself (via block 250), adjusts the playback position according to the input. When the input is received from the screen reader 160, adjusting the playback position is performed by incrementing (e.g. if the auxiliary seek element 316-2 was activated) or decrementing (e.g. if the auxiliary seek element 316-1 was activated) the playback position by a predetermined amount of time defined by an attribute of the relevant auxiliary seek element 316. The adjusted playback position is also reflected in an updated position of the handle 312 on the slider 308.

When the input represents an activation of the primary seek element 308 detected by the browser 156 itself, the adjustment at block 255 is performed by placing the handle 312 of the slider 308 at a position indicated by the input (e.g. by touch screen coordinates), in the case of a touch-and-drag input.

Following adjustment of the playback position at block 245 or at block 250, at block 260, the client device 104-2 (and in particular, the browser 156) can synchronize the updated playback position to at least the activated one of the auxiliary seek elements 316. The auxiliary seek elements 316 can each include a parameter indicating the current playback position, enabling the screen reader 160 to generate audio output via text-to-speech indicating the updated playback position. The performance of the method 200 then returns to block 240 and continues as above until playback terminates. The above-mentioned synchronization process can also be performed following a negative determination at block 250. In particular, because playback proceeds at the default rate in the absence of inputs to adjust playback position, the current playback position stored by the auxiliary seek elements 316 may still be updated periodically (e.g. each second).

Figure 4A:
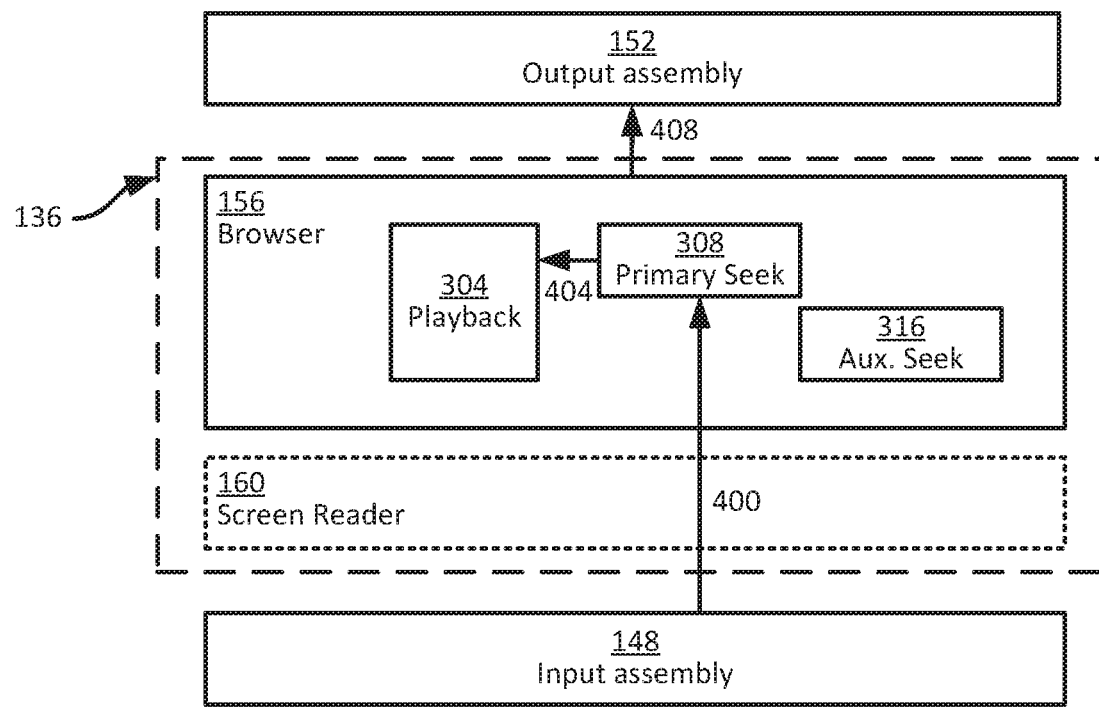
FIGS. 4A and 4B are diagrams illustrating certain internal components of the client device of FIG. 1 during performances of the method of FIG. 2.
Figure 4B:
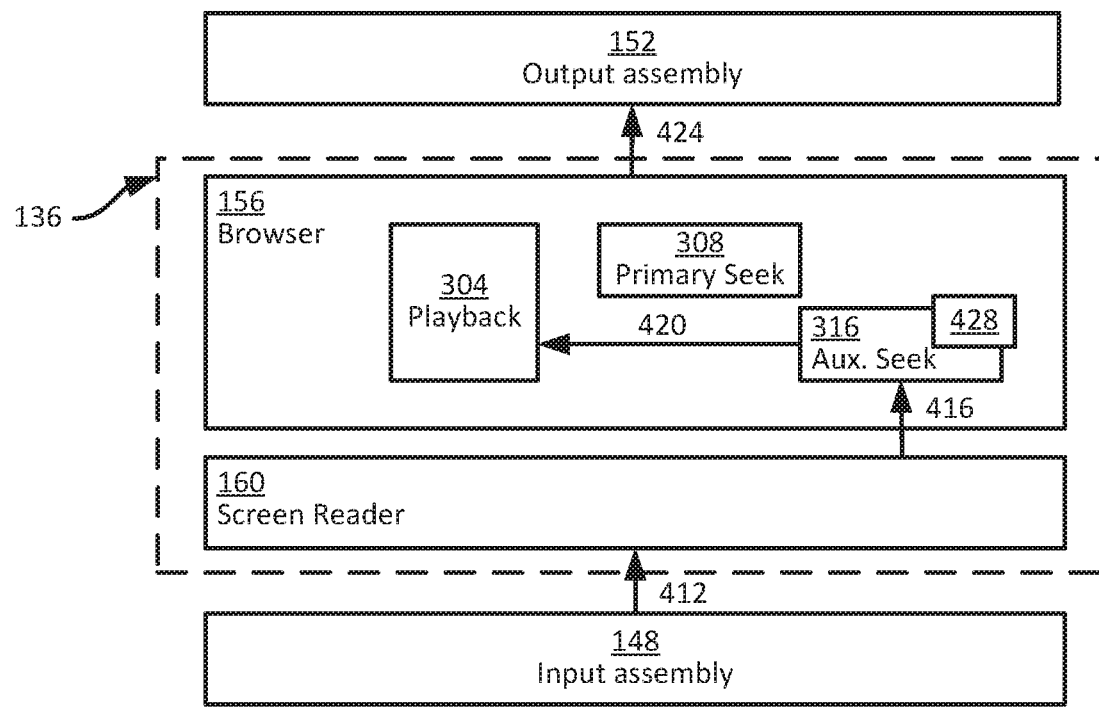

Turning to FIGS. 4A and 4B, respective block diagrams of certain components of the client device 104-2 illustrate the process discussed when the screen reader 160 is inactive (FIG. 4A) and when the screen reader 160 is active (FIG. 4B). Both FIGS. 4A and 4B illustrate execution of the browser 156 by the processor 136 following receipt of the web page. In FIG. 4A, the screen reader 160 is shown in dashed lines, indicating inactivity. In other words, FIG. 4A illustrates operation of the client device 104-2 following a negative determination at block 240. Detection of an activation of the primary seek element 308 at block 250 is shown in FIG. 4A as an input 400 from the input assembly 148 indicating activation of the primary seek element 308. The activation results in a command 404 to adjust the playback position of the multimedia presentation element 304 (at block 255), and the browser 156 controls the output assembly 152 accordingly, via a command 408, FIG. 4B illustrates operation of the client device 104-2 following an affirmative determination at block 240. Detection of an activation of one of the auxiliary seek elements 316 at block 245 is shown in FIG. 4B as an input 412 that is intercepted by the screen reader 160. The screen reader 160 generates an input 416 for processing by the browser 156, and in particular indicating activation of the relevant auxiliary seek element 316. The activation results in a command 420 to adjust the playback position of the multimedia presentation element 304 (at block 255), and the browser 156 controls the output assembly 152 accordingly, via a command 424. A stored playback position indicator 428 associated with the auxiliary seek element 316 can also be updated. The indicator 428 can also be updated when the screen reader 160 is inactive as in FIG. 4A in other examples. For example, the multimedia presentation element 304 can be configured to periodically synchronize a current playback position to the auxiliary seek element 316. In addition, the multimedia presentation element 304 can be configured to transmit a current playback position to the auxiliary seek element in response to the command 420, indicating the playback position resulting from execution of the command 420.

The adjustment specified in the command 420 is an increment or decrement to be applied to the playback position. The magnitude of the increment or decrement can be preconfigured in the executable instructions comprising the respective auxiliary seek elements 316. For example, the auxiliary seek element 316-2 can contain an increment setting specifying a time period (e.g. one second, 5 seconds, or the like) to apply in response to an activation. In still other examples, the auxiliary seek elements 316 can determine the magnitude of the increment or decrement dynamically, for example as a percentage of the total length of the multimedia content (e.g. 2% of the total length, although various other portions are also contemplated).

In further examples, the time periods employed by the auxiliary seek elements 316 can be variable. For example, the auxiliary seek element 316-2 can increase an increment time period when the auxiliary seek element 316-2 is activated more than a threshold number of times in a predetermined period. For example, when the auxiliary seek element 316-2 is activated more than five times over the course of three seconds, the increment time period can be doubled. Conversely, when the activation frequency falls below a lower threshold, the increment time period may be decreased, e.g. to a default increment.

Figure 5:
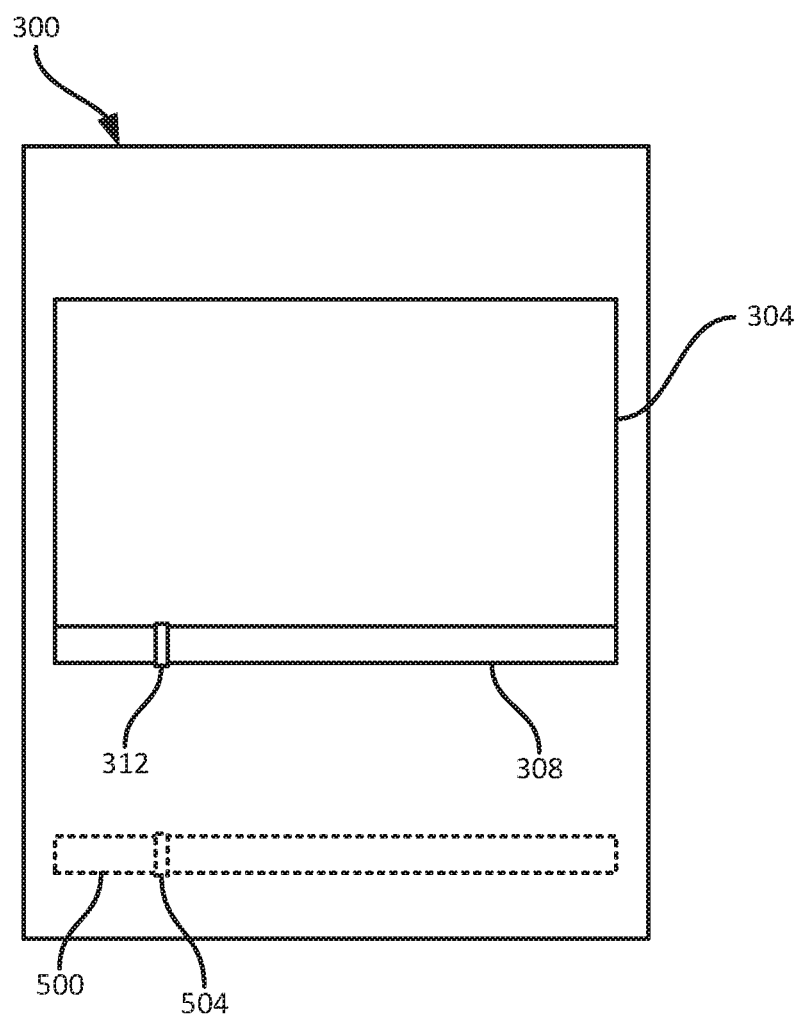
FIG. 5 is a diagram illustrating generation of another example web page during the performance of the method of FIG. 2.

In other examples, other forms of auxiliary seek element can be employed, instead of the buttons shown in FIG. 3. For example, turning to FIG. 5, the display 300, multimedia presentation element 304 and primary seek element 308 are shown. However, instead of the auxiliary seek elements 316, in the illustrated example an auxiliary seek element 500 is generated in the form of an input range element. In the present example, the input range element is presented as a slider including a handle 504. An input range element stores a current value within a predefined range (e.g. a range of 1 to 20, indicating a subdivision of the total length of the multimedia content into twenty steps). The auxiliary seek element 500 can be generated, but not visually rendered on the display 300, such that the auxiliary seek element 500 is detectable by the screen reader 160 but is not visible or selectable on the display 300 and associated touch screen.

Figure 6A:
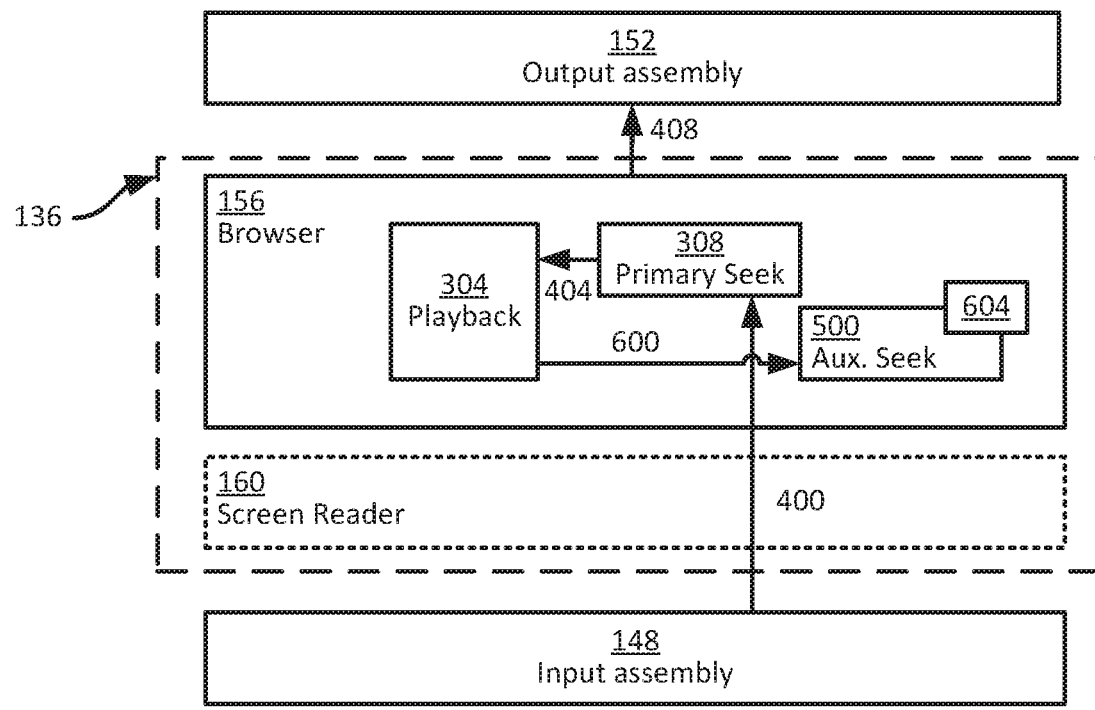
FIGS. 6A and 6B are diagrams illustrating certain internal components of the client device of FIG. 1 during further example performances of the method of FIG. 2.

Turning to FIG. 6A, operation of the client device 104-2 is shown when the screen reader 160 is inactive. The above-mentioned input 400 to the primary seek element 308 results in the command 404 to the multimedia presentation element 304 and subsequent control signal(s) 408 to the output assembly 152. In addition, adjustment of the playback position via either adjustment by the primary seek element 308 or via regular playback is synchronized to the auxiliary seek element 500. That is, the auxiliary seek element 500 stores status data 604 that contains, in addition to a current value of the input range itself, a current playback position. The auxiliary seek element 500, upon receipt of an updated playback position, updates the current input range value to reflect any adjustment to the playback position via a message 600, as will be discussed below in greater detail.

Figure 6B:
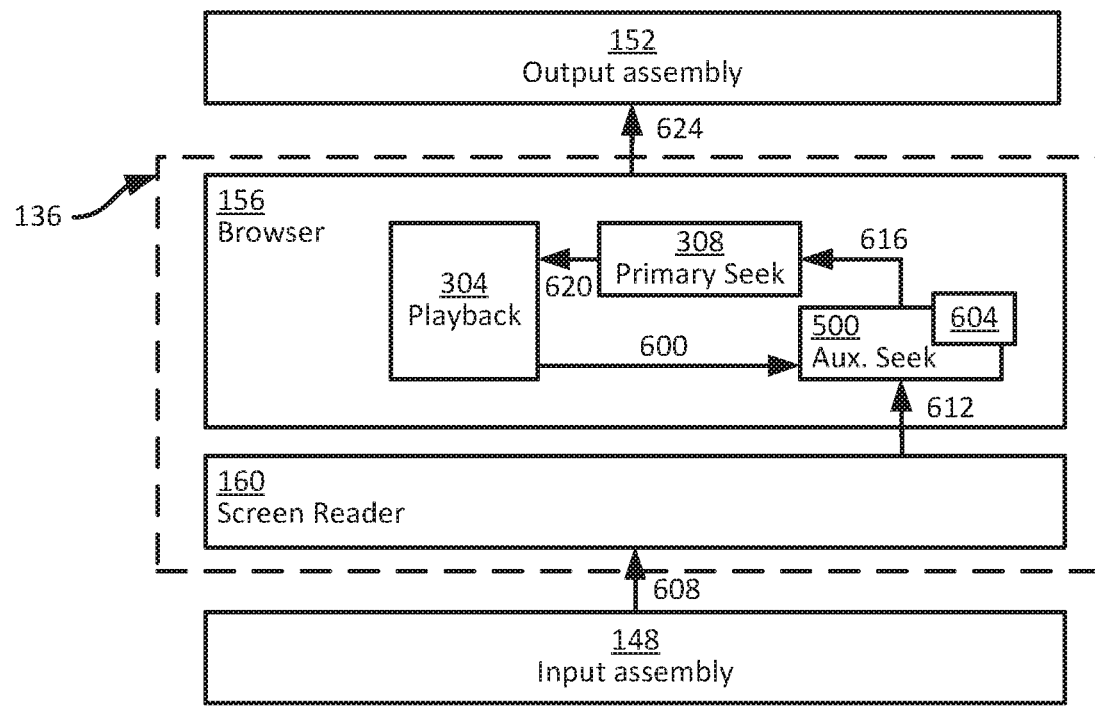

As shown in FIG. 6B, adjustment of the playback position when the screen reader 160 is active differs from the implementation shown in FIG. 4B. In particular, the screen reader 160 detects input 608, such as an activation of a volume key of the input assembly 148. The screen reader 160 can be preconfigured to interpret such an input as an activation of an input range element, when such an element is exposed (as is the case here). Therefore, the screen reader 160 passes an input 612 to the auxiliary seek element 500, for example indicating an increment or decrement of the input range value. The browser 156 therefore increments or decrements the input range value (e.g. by one step) and updates the current value in the status data 604.

The current value of the auxiliary seek element 500 is incremented by one step in the predefined range mentioned above in response to the input 612. For example, if the current value prior to the input 612 was 8 (e.g. within a range of 1 to 20), the current value following the input 612 is 9. In other examples, the auxiliary seek element 500 can be configured to process the input 612 by incrementing or decrementing the current value by more than one step (e.g. from 8 to 11 in a range of 1 to 20). The magnitude of the increment can also be determined dynamically by the auxiliary seek element 500, for example according to an activation frequency, as noted in connection with FIG. 4B. That is, the increment or decrement applied to the current value of the auxiliary seek element 500, in response to the input 612, can be increased in response to an activation frequency above an upper threshold, and/or decreased in response to an activation frequency below a lower threshold.

The browser 156 then determines a primary value, i.e. a playback position, from the updated input range value, and passes the primary value to the primary seek element 308 in a command 616. The primary seek element 308, as shown in FIG. 6B, then updates the playback position of the multimedia presentation element 304 via a message 620, and a control signal 624 is applied to the output assembly 152. To generate the primary value from the input range value, each input range value can be mapped to a particular playback position. For example, when the predefined range corresponding to the auxiliary seek element 500 is between 1 and 20, as discussed above, the twenty input range values are mapped to twenty equally-spaced playback positions. Greater or smaller predefined ranges map to greater or smaller numbers of playback positions. In other examples, the playback positions mapped to the input range values need not be equally spaced. For example, the time between playback positions mapped to input range values near the beginning and end of the predefined range may be smaller than the time between playback positions mapped to input range values in the middle of the predefined range.

As mentioned above in connection with FIG. 6A, adjustment of the playback position via regular playback, in addition to adjustment via activation of the auxiliary seek element 500 and the primary seek element 308, is also employed to update the input range value via the message 600. Upon receiving an updated playback position in the message 600, the browser 156 generates an input range value from the playback position, for example by determining a number of available steps of the auxiliary seek element 500, and determining which of those steps is closest to the current playback position.

Those skilled in the art will appreciate that in some embodiments, the functionality of any one or more of the applications 132, 156 and 160 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A computing device, comprising:
   an input assembly;
   a display; and
   a controller connected with the input assembly and the display, the controller configured to:
      execute a screen reader process;
      via execution of a browser application, control the display to render a web page containing (i) a media presentation element to present multimedia content received at the computing device; (ii) a primary seek element selectable to control a playback position in the media presentation element, wherein the primary seek element includes an attribute that one or more of: hides the primary seek element from the screen reader process; and results in the primary seek element being undiscoverable by the screen reader process; and (iii) an auxiliary seek element selectable to control the playback position in the media presentation element;
      receive, via the input assembly, screen reader input data or browser input data, the screen reader input data comprising activation of the auxiliary seek element generated via execution of the screen reader process; the browser input data comprising respective activation of the primary seek element generated via execution of the browser application; the screen reader input data being different from the browser input data, in response to receiving the screen reader input data, via execution of the screen reader process, generate a respective input for processing by the browser application, the respective input to activate the auxiliary seek element at the browser application to control the display to adjust the playback position in the media presentation element according to the screen reader input data; and in response to receiving the browser input data, activate the primary seek element to control the display to adjust the playback position in the media presentation element according to the browser input data.

2. The computing device of claim 1, wherein the primary seek element includes a slider.

3. The computing device of claim 2, wherein the auxiliary seek element includes a first button and a second button; and wherein the controller is configured, when the screen reader input data indicates activation of the auxiliary seek element, to adjust the playback position by applying a negative or positive time increment to a current playback position.

4. The computing device of claim 3, wherein the first button and the second button are transparent.

5. The computing device of claim 3, wherein the first button is overlaid on a first portion of the slider, and wherein the second button is overlaid on a second portion of the slider.

6. The computing device of claim 2, wherein the auxiliary seek element includes a range input.

7. The computing device of claim 6, wherein the controller is configured to generate the range input as a slider.

8. The computing device of claim 6, wherein the controller is configured, in order to adjust the playback position in response to receiving the screen reader input data indicating an activation of the auxiliary seek element, to:

determine, from the screen reader input data, a selected value for the range input;

generate, from the selected value, a primary input value; and pass the primary input value to the primary seek element for adjustment of the playback position.

9. The computing device of claim 8, wherein the controller is further configured, responsive to adjustment of the playback position in response to receipt of the browser input data indicating a selection of the primary seek element, to:

determine, from an adjusted playback position, an updated range input value; and store the updated range input value and the adjusted playback position in association with the auxiliary seek element.

10. A method, comprising:

at a processor of a computing device having a display and an input assembly, executing a screen reader process;

executing, via the processor, a browser application to control the display to render a web page containing (i) a media presentation element to present multimedia content received at the computing device; (ii) a primary seek element selectable to control a playback position in the media presentation element, wherein the primary seek element includes an attribute that one or more of: hides the primary seek element from the screen reader process; and results in the primary seek element being undiscoverable by the screen reader process; and (iii) an auxiliary seek element selectable to control the playback position in the media presentation element;

receiving, at the processor, via the input assembly, screen reader input data or browser input data, the screen reader input data comprising activation of the auxiliary seek element generated via execution of the screen reader process; the browser input data comprising respective activation of the primary seek element generated via execution of the browser application, the screen reader input data being different from the browser input data, in response to receiving the screen reader input data, generating, via the processor executing the screen reader process, a respective input for processing by the browser application, the respective input to activate the auxiliary seek element at the browser application to control the display to adjust the playback position in the media presentation element according to the screen reader input data; and in response to receiving the browser input data, activating the primary seek element to control the display to adjust the playback position in the media presentation element according to the browser input data.

11. The method of claim 10, wherein the primary seek element includes a slider.

12. The method of claim 11, wherein the auxiliary seek element includes a first button and a second button; and wherein the method further comprises:

when the screen reader input data indicates activation of the auxiliary seek element, adjusting the playback position by applying a predetermined negative or positive time increment to a current playback position.

13. The method of claim 12, wherein the first button and the second button are transparent.

14. The method of claim 12, wherein the first button is overlaid on a first portion of the slider, and wherein the second button is overlaid on a second portion of the slider.

15. The method of claim 11, wherein the auxiliary seek element includes a range input.

16. The method of claim 15, further comprising generating the range input as a slider.

17. The method of claim 15, wherein adjusting the playback position in response to receiving the screen reader input data indicating an activation of the auxiliary seek element includes:

determining, from the screen reader input data, a selected value for the range input;

generating, from the selected value, a primary input value; and passing the primary input value to the primary seek element for adjustment of the playback position.

18. The method of claim 17, further comprising, responsive to adjustment of the playback position in response to receipt of the browser input data indicating a selection of the primary seek element:

determining, from an adjusted playback position, an updated range input value; and storing the updated range input value and the adjusted playback position in association with the auxiliary seek element.

* * * * *